United States Patent
Bocquet et al.

[19]

[11] Patent Number: 6,138,737
[45] Date of Patent: Oct. 31, 2000

[54] METHOD AND MACHINE FOR MOUNTING TIRES

[75] Inventors: Jean-Louis Bocquet, Combronde; Alain Carreau, Les-Martres-de-Veyre; Denis Meloux, Clermont-Ferrand, all of France

[73] Assignee: Compagnie Generale des Etablissements Michelin - Michelin & Cie, Clermont-Ferrand Cedex, France

[21] Appl. No.: 09/317,252

[22] Filed: May 24, 1999

[30] Foreign Application Priority Data

May 25, 1998 [FR] France .................................. 98 06571

[51] Int. Cl.[7] .................................................. B60C 25/135
[52] U.S. Cl. .......................... 157/1.22; 157/1.1; 157/1.17
[58] Field of Search ..................... 157/1.22, 1.2, 157/1.24, 1.17, 1.1

[56] References Cited

U.S. PATENT DOCUMENTS

| | | |
|---|---|---|
| 1,850,053 | 3/1932 | Stevens . |
| 2,546,988 | 4/1951 | Eberly . |
| 3,722,570 | 3/1973 | McKenney ............................. 157/1.28 |
| 3,734,159 | 5/1973 | Schultz et al. . |
| 3,786,852 | 1/1974 | Houston .................................... 157/1.1 |
| 4,621,671 | 11/1986 | Kane et al. . |
| 4,800,944 | 1/1989 | Kane .................................... 157/1.22 |
| 5,141,040 | 8/1992 | Curcuri . |
| 5,603,148 | 2/1997 | Hjorth-Hansen ....................... 29/33 R |

FOREIGN PATENT DOCUMENTS

| | | | |
|---|---|---|---|
| 2049645 | 5/1972 | Germany . | |
| 25 35 734 A1 | 2/1977 | Germany .............................. 157/1.17 |

*Primary Examiner*—Stephen F. Gerrity
*Assistant Examiner*—Hadi Shakeri
*Attorney, Agent, or Firm*—Baker Botts L.L.P.

[57] ABSTRACT

A method and machine for mounting tires, bead by bead, in which, after having partially set a first bead in place in the groove of a wheel rim, that mounting of the first bead of the tire is completed by means of a rotation of the wheel and tire assembly against a mounting roller.

14 Claims, 5 Drawing Sheets

METHOD AND MACHINE FOR MOUNTING TIRES

BACKGROUND OF INVENTION

The object of the present invention is a method and a machine for mounting tires on wheels; the invention concerns the mounting of tires of utility vehicles, notably, trucks, farm machinery and handling equipment. It pertains, in particular, to the mounting of tires bead by bead on the rim of a wheel.

The present mounting machines (for example, as disclosed in U.S. Pat. Nos. 3,461,938 and 3,978,903) usually carry out simultaneously mounting of the two beads of the tire over the flanges of the wheel rim. In the most general case of tubeless tires, the tire is then brought to an inflation station where the two beads are simultaneously pushed on their respective seats to ensure tightness before inflation.

This method conceivably subjects the beads and the rim to considerable stresses which can damage them; that is remedied, as far as the beads are concerned, by application of a lubricating liquid on the rim seats (U.S. Pat. No. 3,658,152) before expansion of the beads.

U.S. Pat. No. 4,621,671 discloses a method and a machine for mounting tires bead by bead on a wheel with a rim having two flanges and a groove. The method of placement of the first bead consists of:

engaging a first bead around a corresponding arc of a first rim flange in order to bring that arc inside the tire;

placing a roller in a given position relative to the wheel and tire assembly; and carrying out a relative displacement of the wheel and tire assembly and of the roller in order to bring the rest of the first rim flange inside the tire and thus complete placement of said first bead.

In this method, the wheel is laid flat (with the wheel axis vertical), the roller is placed in front of the tire and wheel assembly on the side of the arc of the first flange already in the tire and at a given distance from the outer plane $P_c$ of the first rim flange; the relative displacement of the wheel and tire assembly and roller is then a translation such that the distance between the roller and the outer plane $P_c$ of the first rim flange remains appreciably constant and close to zero.

This machine makes it possible to reduce appreciably the stresses of mounting the first bead in the rim groove.

Another problem concerns the present wheels, which are increasingly made of an aluminum-base light alloy in order to be less heavy and offer a greater variety of shapes. These wheels are less hard than the steel rims and the feed and placement means of the usual machines are often apt to damage them, for example, when locking the flanges of the wheel rims for the mounting.

SUMMARY OF THE INVENTION

The object of the present invention is a method and machine for mounting tires, bead by bead, which is particularly advantageous with light alloy wheels.

According to the invention, the method of mounting the first bead of a tire on the rim of a wheel having a first and a second flange comprises the following stages:

the first bead is engaged around a corresponding arc of the first rim flange in order to bring that arc of the rim flange inside the tire;

a mounting roller is applied against the wall of the tire opposite the first bead already engaged;

the mounting roller and the wheel are displaced in relation to each other by a movement which separates the mounting roller from the arc of the first rim flange already inside the tire, that movement following a curved path relative to the plane $P_c$ of the first rim flange and the concavity of the movement being turned on the side of said wheel, so that the first rim flange is progressively engaged against the first bead until its complete entrance inside the tire.

The completion of mounting of the first bead by this relative movement between the roller and the wheel with concavity turned toward the wheel makes it possible to limit considerably the stresses on mounting the first bead on a very large number of types of wheels to be fitted in practice and thus accomplish a very progressive mounting without any damage to the bead of the tire.

This relative movement is advantageously such that the distance E between the plane PC of the first rim flange and mounting roller passes a maximum and the mounting roller is applied against the wall of the tire on the side of the wheel axis where the first flange is engaged in the tire.

According to a simple embodiment, the relative movement between the mounting roller and the wheel is a rotation of axis A placed outside the plane $P_c'$ of the second rim flange and offset from the axis of the wheel by a distance D, on the side of the wheel opposite that of the arc of the first flange initially brought inside the tire.

In a preferred embodiment, after having engaged the first bead around a corresponding arc of the first rim flange in order to bring said arc of said rim flange inside the tire:

a first rotation of amplitude a of the wheel and tire assembly is made around the axis of rotation A; then a translation of the wheel and tire assembly is made until the mounting roller is applied against the wall of the tire opposite the first bead already engaged; and placement of the first bead is completed by a rotation of the tire and wheel assembly to an angle β.

The angle α is advantageously between 30° and 60° and preferably between 45° and 55°. The angle β is preferably 90°. This makes it possible, after having completed placement of the first bead, to discharge the wheel and tire assembly, the wheel being flat (the axis of the wheel being vertical).

It is advantageous to place the wheel in vertical position before engaging the first bead around a corresponding arc of the first rim flange.

This has the advantage of making possible a manual or automatic feed of the tires and of carrying out that engagement very easily by simple tilting of the tire.

The second bead is advantageously positioned by means of a rotary head mounted on a retractable carriage, and then the mounted assembly thus obtained is discharged.

The object of the invention is also a machine for mounting tires on wheels containing means of transfer of the wheels to be fitted and of the mounted assemblies, means of placement of the first bead of each tire and means of placement of the second bead, in which the means of mounting the first bead include:

a hub to which the wheel receiving the tire to be mounted is fitted;

a mounting roller of horizontal axis R; and means of relative displacement of the hub and mounting roller, characterized in that these means make it possible to bring said hub mounting roller closer at a given distance and to carry out a rotation of the hub of horizontal axis A parallel to the axis of the mounting roller between a vertical position of the hub and a horizontal position of the hub.

The axis A of rotation of the hub is advantageously shifted by a distance D under the axis of the hub, said hub being in vertical position, and the hub contains means of fitting the wheel through the center bore of the disk of said wheel.

The use of an attachment through the center bore of the wheel disk has the advantage of very precisely positioning the wheels relative to the hub without entailing any risk of visible damage to these wheels. This is particularly important for light alloy wheels which are much more sensitive to scratches.

The mounting machine according to the invention advantageously contains means for identifying the type of wheel to be fitted. This makes it possible, notably, to determine immediately, depending on the type of wheel, the adjustment characteristics to be used on mounting of the first bead.

DESCRIPTION OF THE DRAWINGS

A working example of the invention, given without limitation, will be described in detail, referring to the attached drawing, in which.

DESCRIPTION OF PREFERRED EMBODIMENTS

Figure 1:
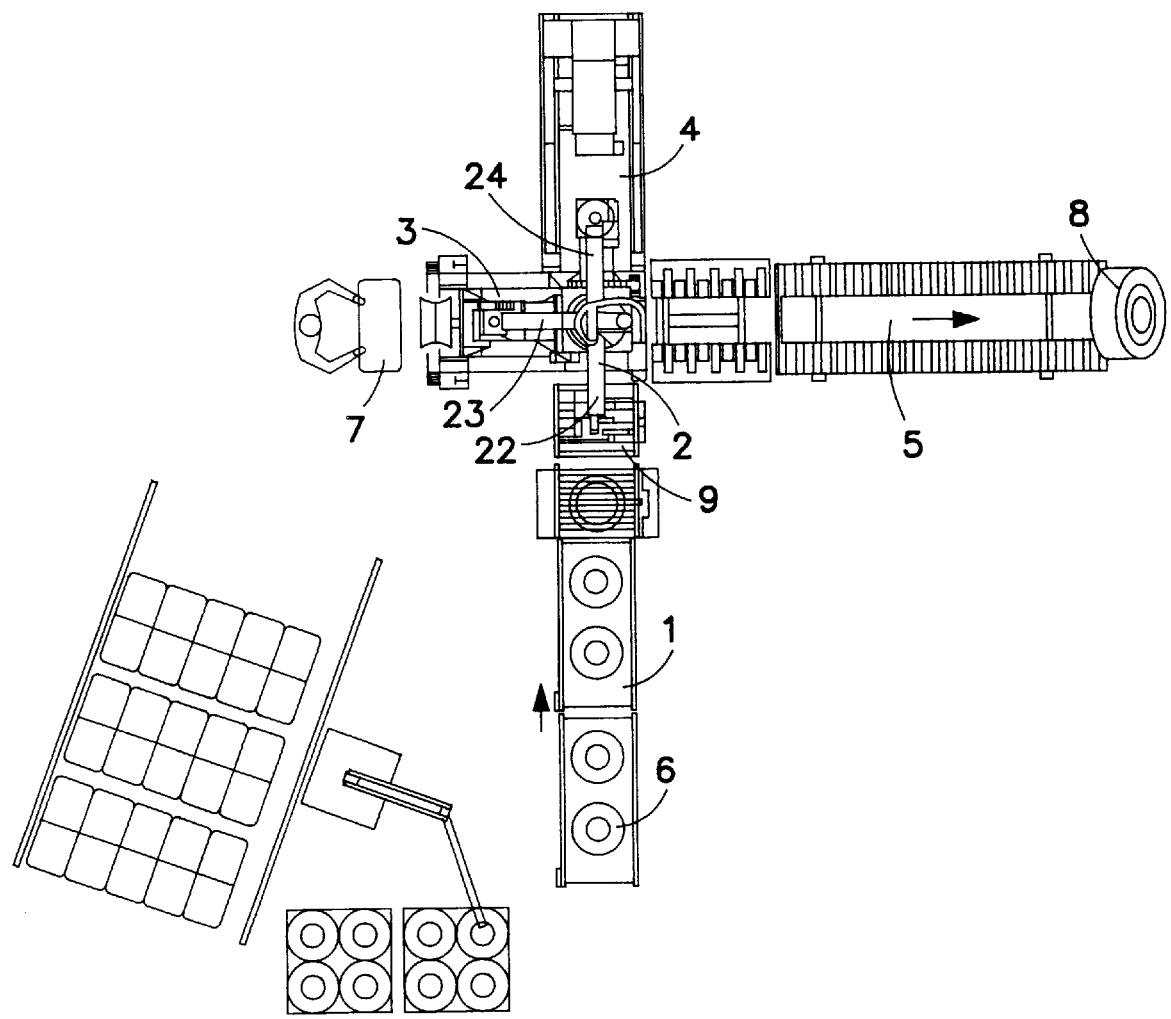
FIG. 1 is a schematic top view of the tire mounting machine according to the invention.

Referring to FIG. 1, the machine has a feed conveyor 1 for the wheels 6 to be fitted, a carrousel 2 designed to transfer the wheels 6 and mounted assemblies 8 from one station of the machine to another, a station 3 for mounting the first bead of the tires 7, a station 4 for mounting of the second bead and a discharge conveyor 5 for the mounted assemblies 8.

The feed conveyor 1 for the wheels 6 can be advanced manually or automatically. The wheels 6 are placed flat (with their axis vertical) on the conveyor 1. The feed conveyor supplies a wheel to a measuring station 9. This measuring station 9 makes it possible to identify and check the type of wheel to be fitted. Depending on the type of wheel, the settings of the mounting stations can be adjusted.

Figure 2:
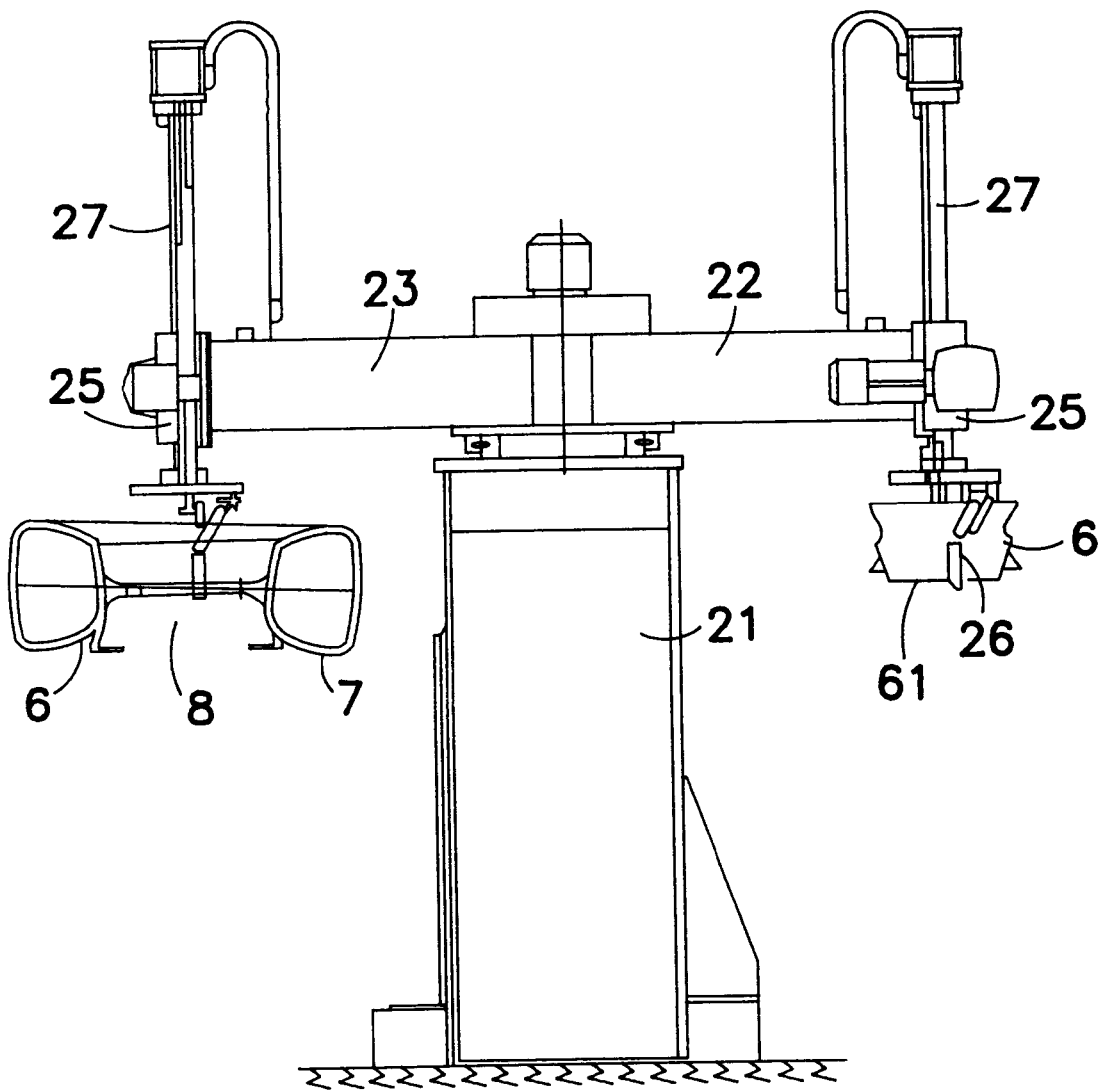
FIG. 2 shows means for transferring the wheels and mounted assemblies.

The carrousel 2 (see FIGS. 1 and 2) consists of a frame 21 and three arms 22, 23 and 24 arranged in a T-shape. Each arm carries an identical device 25 for gripping the wheels 6 and mounted assemblies 8 with sets of articulated parts 26 which are inserted in the center bore of the disks 61 of the wheels 6 before their expansion. Each device 25 embodies a driving rack 27 for vertically displacing the component carried. Wheels 6 having different diameters, 150 to 300 mm, for example, can thus be grasped.

The carrousel 2 can carry three components simultaneously and makes alternate rotations of 90°. This makes it possible to bring in a wheel to be fitted, to position a partially mounted assembly (first bead) and to discharge a completely mounted assembly (two beads). During the actual mounting phases, the arms of the carrousel 2 are in intermediate position at 45° from the gripping positions.

Figure 3:
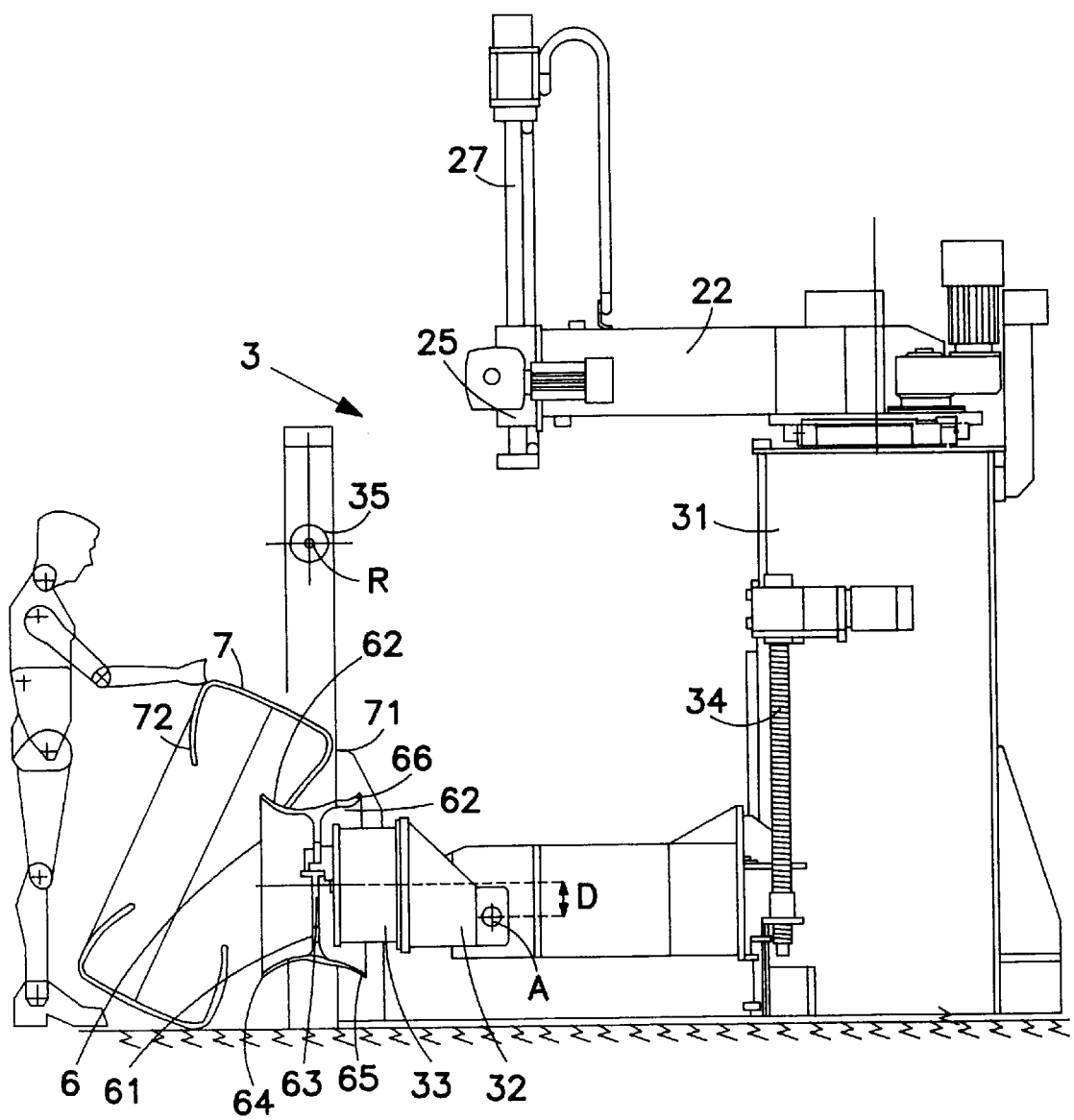
FIG. 3 is a schematic view of the means of mounting the first bead of a tire on a wheel rim.

FIG. 3 shows a mounting station 3 for the first bead 71 of a tire 7. This station 3 comprises a structure 31 on which is mounted a frame 32 articulated on a horizontal axis A. Said frame 32 has a hub 33 on which a wheel to be fitted 6 can be attached. The frame 32 is mobile in rotation on its axis A between a vertical position (FIG. 3—axis of hub horizontal) and a horizontal position (axis of hub vertical). A driving screw 34 makes it possible to displace the frame vertically. The station 3 also includes a mounting roller 35 having an axis R horizontal and parallel to the axis A of rotation of the frame and hub. The mounting roller 35 can be set at variable heights. The mounting roller 35 is elongated and preferably extends across the tires to be mounted.

The method of mounting the first bead 71 of a tire 7 is now explained with the aid of FIG. 3 and the four sketches of FIG. 4.

The arm 22 grasps a wheel 6 on the measuring station of the feed conveyor 1 and then makes a 90° turn to position that wheel above the hub 33, placed in horizontal position (axis vertical). The rack 27 deposits the wheel 6 on the hub 33, which fits the wheel firmly and centered by known means. Fitting is carried out again through the center bore 63 of the disk 61 of the wheel 6.

The hub 33 and the frame 32 are then placed in vertical position (axis horizontal) at a proper distance from the ground, so that an operator can set the top of the first bead 71 of the tire 7 in place in the groove 66 of the rim 62 over the top of the first flange 64 of the rim 62 of the wheel 6 by simply tilting the tire 7, as indicated in FIG. 3. The tire, the wheel and the mounting roller are then in the position shown in FIG. 4a.

Figure 4A:
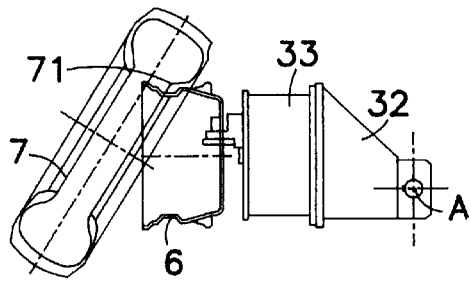
FIGS. 4a, b, c and d are schematic views of the phases of mounting the first bead on a rim.
Figure 4B:
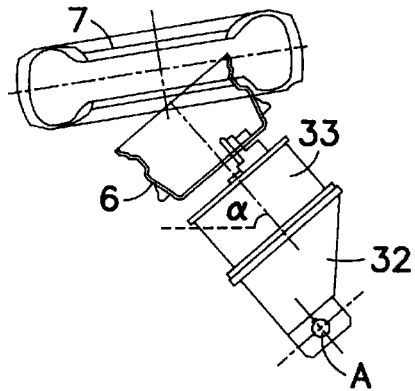

A rotation of angle a of the frame 32, hub 33, wheel 6 and tire 7 assembly is then carried out, as indicated in FIG. 4b, so as to present the tire under the mounting roller 35.

Figure 4C:
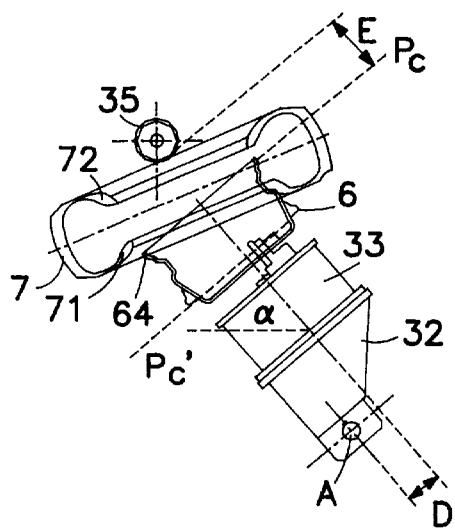

When the axis of the wheel 6 and hub 33 forms an angle $\alpha$ of approximately 45 to 55° with the horizontal, rotation is interrupted and a vertical translation of the assembly is carried out so as to bring the outer wall of the tire against the mounting roller 35 until the distance between the mounting roller 35 and the plane $P_c$ of the first flange 64 of the wheel 6 is at a predetermined distance E (see FIG. 4c). The value of said clearance E is in the order of 70 to 100 mm.

Figure 4D:
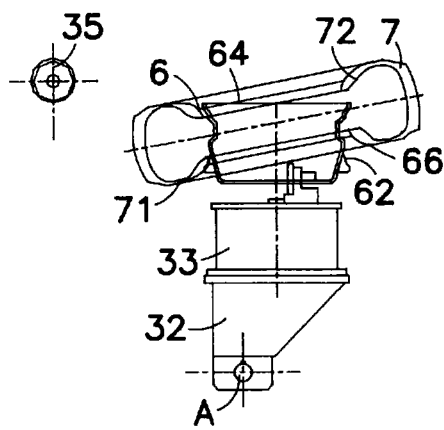

Rotation of the hub 33, wheel 6 and tire 7 assembly is then completed to a horizontal position of the hub 33 (vertical axis) (FIG. 4d).

During this last rotation, the mounting roller 35 compresses the wall and the outer bead 72 of the tire 7 against the first flange 64 of the wheel 6 and thus makes the entire first bead 71 pass over the first rim flange 64. This completes mounting of the first bead 71 of the tire 7 on the rim 62.

It is to be noted that, when the roller 35 comes in contact and compresses the outer wall of the tire 7, it is situated relative to the wheel axis slightly on the side of the first bead already placed in the groove 66 of the rim 62.

Axis A is slightly offset by a distance D relative to the axis of the wheel and hub, as indicated in FIGS. 3 and 4c. This offset results in an initial increase in the distance E on rotation of the wheel and tire assembly against the mounting roller; distance E then passes a maximum value. Said variation of distance E enables mounting to be carried out very progressively and regularly; this has the effect of limiting the mounting stresses of the first bead on the rim flange and of ensuring good placement of the tire on the wheel.

Distance E differs, of course, with the diameter of the rim seat: standardized values of 17.5, 19.5 and 22.5 inches (44.45, 49.53 and 57.15 mm) or others.

When the angle of inclination of the wheel axis reaches 90°, the first bead has been completely mounted (FIG. 4d).

The partially mounted assembly of wheel 6 and tire 7 is then taken up by the arm 24 of the carrousel 2 and positioned on the mounting station 4 of the second bead 72.

Figure 5:
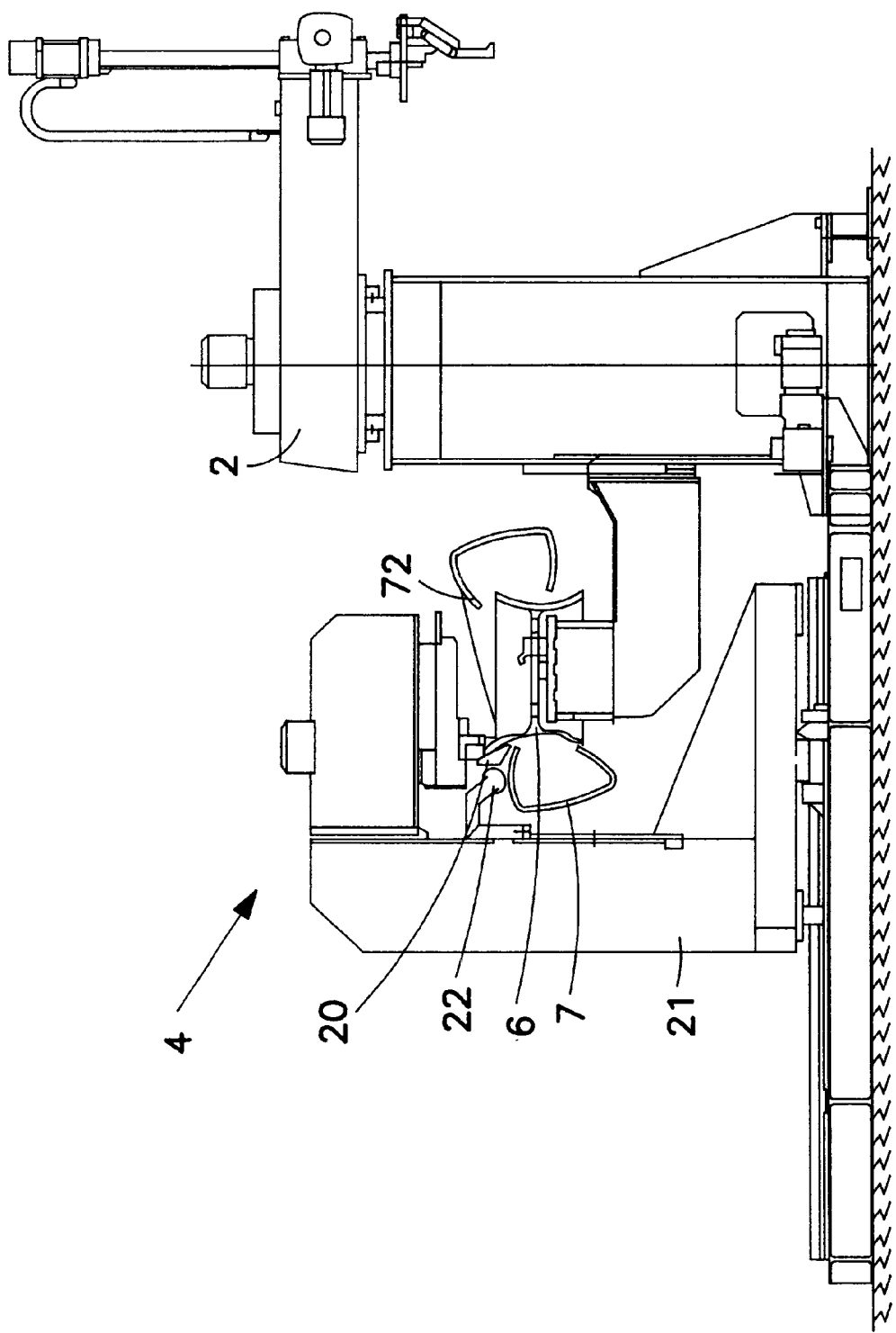
FIG. 5 is a schematic view of the means of mounting the second bead of a tire on the rim.

As can be seen in FIG. 5, this station 4 proceeds with mounting of the second bead 72 according to known methods: the partially mounted assembly of wheel 6 and tire 7 is positioned by the carrousel 2 previously described so as to be presented under a rotary head 20 mounted on a retractable carriage 21; said carriage has a system 22 for holding in mounting position (bottom of groove) and for stopping on rotation of the tire 7. The rotary head 20 has a system for automatic adjustment of position according to the dimensions of the rim.

The carrousel grasps the mounted assembly, finally, in order to bring it to the discharge conveyor 5.

The machine just described can mount at least 430 tires per eight-hour shift, that is, an average of over 50 tires per hour. It can handle standard seat dimensions of 17.5, 19.5 and 22.5 inches or others and rim widths of 5.25 to 18 inches (13.33 to 45.72 mm). The maximum diameter of a tire that can be mounted is 1250 mm and the maximum weight of the mounted assembly is 180 kg.

In the example described, the tires are fed manually; the feed could also be automated.

The mounting machine and method according to the invention, which have been described, are particularly indicated for mounting truck tires. They can also be applied to mounting other types of tires for utility vehicles, notably, farm machinery or handling equipment.

We claim:

1. A method of mounting a first bead of a tire on a rim of a wheel having an axis and a first and a second flange, comprising:

engaging the first bead around a corresponding arc of the first rim flange in order to bring that arc of the rim flange inside the tire;

applying a mounting roller against the wall of the tire opposite the first bead already engaged;

displacing the mounting roller and the wheel in relation to each other by a movement which separates the mounting roller from the arc of the first rim flange already inside the tire, said movement following a curved path relative to a plane $P_c$ of the first rim flange and the concavity of the movement being turned on the side of said wheel, so that the first rim flange is progressively engaged against the first bead until its complete entrance inside the tire.

2. A method according to claim 1, in which the relative movement between the mounting roller and the wheel is such that the distance E between the plane $P_c$ of the first rim flange and the mounting roller passes a maximum value.

3. A method according to claim 1, in which the mounting roller is applied against the wall of the tire on the side of the axis of the wheel where the first flange is engaged in the tire.

4. A method according to claim 1, in which the relative movement between the mounting roller and the wheel is a rotation of axis A placed outside a plane $P_c'$ of the second rim flange and offset from the axis of the wheel by a distance D, on the side of the wheel opposite that of the arc of the first flange initially brought inside the tire.

5. A method of mounting according to claim 4, in which, after having engaged the first bead around a corresponding arc of the first rim flange in order to bring said arc of said rim flange inside the tire:

a first rotation of angle a of the wheel and tire assembly is made around the axis of rotation A; then a translation of the wheel and tire assembly is made until said mounting roller is applied against the wall of the tire opposite the first bead already engaged; and placement of the first bead is completed by a rotation of the tire and wheel assembly to an angle β.

6. A method of mounting according to claim 5, in which the angle α ranges between 30 and 60 degrees.

7. A method of mounting according to claim 5, in which the angle α ranges between 45 and 55 degrees.

8. A method of mounting according to claim 5, in which the angle β is equal to 90°.

9. A method of mounting according to claim 1, in which the wheel is placed in vertical position before engaging the first bead around a corresponding arc of the first rim flange.

10. A method of mounting a tire having a first and a second bead on the rim of a wheel having a first and a second flange and a groove, in which, after having set the first bead in place according to the method of claim 1, the second bead of the tire is set in place to produce a mounted assembly by means of a rotary head mounted on a retractable carriage and then the mounted assembly is discharged.

11. A machine for mounting tires on wheels comprising means for transfer of the wheels to be fitted and for transfer of the mounted assemblies, means for mounting of the first bead of each tire and means for mounting of the second bead, in which said means for mounting the first bead include:

a hub to which the wheel receiving the tire to be mounted is fitted;

a mounting roller of horizontal axis R; and means for relatively displacing the hub and mounting roller, characterized in that said displacing means move said hub and mounting roller closer at a given distance and displace the hub about a horizontal axis A, parallel to the axis of the mounting roller, between a vertical position of the hub and a horizontal position of the hub.

12. A machine for mounting according to claim 11, in which the hub has an axis on which the wheel is centered and the axis A of displacement of the hub is offset by a distance D below the axis of the hub in the vertical position of the hub in which position the axis of the hub is horizontal.

13. A machine for mounting according to claim 11, in which the wheel has a disk with a center bore and said hub includes means for fitting the center bore of the disk of the wheel on the hub.

14. A machine for mounting according to claim 11, including means for identifying the type of wheel to be fitted.

\* \* \* \* \*

UNITED STATES PATENT AND TRADEMARK OFFICE
CERTIFICATE OF CORRECTION

PATENT NO. : 6,138,737
DATED : October 31, 2000
INVENTOR(S) : Bocquet et al.

It is certified that error appears in the above-identified patent and that said Letters Patent is hereby corrected as shown below:

Column 2,
Line 15, "PC" should read -- $P_c$ --
Line 16, "mounting" should read -- the mounting --
Line 28, "a" (second occurrence) should read -- $\alpha$ --

Column 6,
Line 7, "a" (second occurrence) should read -- $\alpha$ --

Signed and Sealed this

Fifth Day of February, 2002

Attest:

*Attesting Officer*

JAMES E. ROGAN
*Director of the United States Patent and Trademark Office*